United States Patent
Odinak et al.

(10) Patent No.: US 10,841,423 B2
(45) Date of Patent: *Nov. 17, 2020

(54) COMPUTER-IMPLEMENTED SYSTEM AND METHOD FOR EFFICIENTLY FACILITATING APPOINTMENTS WITHIN A CALL CENTER VIA AN AUTOMATIC CALL DISTRIBUTOR

(71) Applicant: Intellisist, Inc., Seattle, WA (US)

(72) Inventors: Gilad Odinak, Bellevue, WA (US); David Milstein, Redmond, WA (US); Tamilselvan Ramasamy, Sammamish, WA (US)

(73) Assignee: Intellisist, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/811,551

(22) Filed: Nov. 13, 2017

(65) Prior Publication Data

US 2018/0069960 A1 Mar. 8, 2018

Related U.S. Application Data

(63) Continuation of application No. 13/802,710, filed on Mar. 14, 2013, now Pat. No. 9,819,798.

(51) Int. Cl.
*H04M 3/51* (2006.01)
*G06Q 10/06* (2012.01)
(Continued)

(52) U.S. Cl.
CPC .... *H04M 3/5175* (2013.01); *G06Q 10/06311* (2013.01); *G06Q 10/109* (2013.01);
(Continued)

(58) Field of Classification Search
CPC ... H04M 3/5175; H04M 3/523; H04M 3/5238
(Continued)

(56) References Cited

U.S. PATENT DOCUMENTS

| | | | |
|---|---|---|---|
| 5,298,890 A | 3/1994 | Kanamaru et al. | |
| 5,388,252 A | 2/1995 | Dreste et al. | |

(Continued)

OTHER PUBLICATIONS

Al Aubaidi, Rasha S.; Notice of Allowance; U.S. Appl. No. 13/802,710; dated Aug. 10, 2017; United States Patent and Trademark Office; Alexandria, VA.

(Continued)

*Primary Examiner* — Rasha S Al Aubaidi
(74) *Attorney, Agent, or Firm* — Stevens & Showalter, LLP

(57) ABSTRACT

A computer-implemented system and method for facilitating appointments within a call center is provided. A list of agents for scheduling meetings within a call center is received from a user. An availability status is determined for each agent on the list at a common time. A determination that all the agents on the list are unavailable for a meeting with the user at the common time is made. A notice is provided to the user that all the agents on the list are unavailable. The agents are tracked and at a later time, one of the agents is determined to be available. A determination is made that the user is available at the later time and the available agent is transferred to the user.

18 Claims, 7 Drawing Sheets

(51) Int. Cl.
*G06Q 10/10* (2012.01)
*H04M 3/523* (2006.01)

(52) U.S. Cl.
CPC ...... *H04M 3/523* (2013.01); *H04M 2203/401* (2013.01); *H04M 2203/402* (2013.01)

(58) Field of Classification Search
USPC .................. 379/265.01–265.03, 266.06
See application file for complete search history.

(56) References Cited

U.S. PATENT DOCUMENTS

| | | | |
|---|---|---|---|
| 5,485,569 | A | 1/1996 | Goldman et al. |
| 5,621,454 | A | 4/1997 | Ellis et al. |
| 5,732,394 | A | 3/1998 | Nakadai et al. |
| 5,790,798 | A | 8/1998 | Beckett, II et al. |
| 5,815,138 | A | 9/1998 | Tsubaki et al. |
| 5,818,930 | A | 10/1998 | Mark |
| 5,825,871 | A | 10/1998 | Mark |
| 5,870,079 | A | 2/1999 | Hennessy |
| 5,900,877 | A | 5/1999 | Weiss et al. |
| 5,974,385 | A | 10/1999 | Ponting et al. |
| 6,128,380 | A | 10/2000 | Shaffer et al. |
| 6,263,049 | B1 | 7/2001 | Kuhn |
| 6,269,332 | B1 | 7/2001 | Choo et al. |
| 6,370,574 | B1 | 4/2002 | House et al. |
| 6,477,492 | B1 | 11/2002 | Connor |
| 6,519,699 | B2 | 2/2003 | Lu et al. |
| 6,583,781 | B1 | 6/2003 | Joshi et al. |
| 6,754,155 | B1 | 6/2004 | Hayashi et al. |
| 6,865,162 | B1 | 3/2005 | Clemm |
| 7,097,108 | B2 | 8/2006 | Zellner |
| 7,343,173 | B2 | 3/2008 | Leedom, Jr. |
| 7,502,741 | B2 | 3/2009 | Finke et al. |
| 7,599,847 | B2 | 10/2009 | Block et al. |
| 7,716,054 | B2 | 5/2010 | Harris et al. |
| 7,752,043 | B2 | 7/2010 | Watson |
| 7,769,176 | B2 | 8/2010 | Watson et al. |
| 7,774,854 | B1 | 8/2010 | Watson et al. |
| 8,693,674 | B1 * | 4/2014 | Darby ................ H04M 3/5158 379/265.01 |
| 9,819,798 | B2 | 11/2017 | Odinak et al. |
| 2002/0065668 | A1 | 5/2002 | Goodwin |
| 2002/0083192 | A1 | 6/2002 | Alisuag |
| 2003/0046554 | A1 | 3/2003 | Leydier et al. |
| 2003/0079224 | A1 | 4/2003 | Komar et al. |
| 2003/0120936 | A1 | 6/2003 | Farris et al. |
| 2003/0125958 | A1 | 7/2003 | Alpdemir et al. |
| 2004/0006478 | A1 | 1/2004 | Alpdemir et al. |
| 2004/0064317 | A1 | 4/2004 | Othmer et al. |
| 2004/0068661 | A1 | 4/2004 | Dettinger et al. |
| 2004/0181679 | A1 | 9/2004 | Dettinger et al. |
| 2004/0210637 | A1 | 10/2004 | Loveland |
| 2005/0114379 | A1 | 5/2005 | Lee |
| 2005/0204312 | A1 | 5/2005 | Rosel |
| 2005/0132070 | A1 | 6/2005 | Redlich et al. |
| 2005/0238174 | A1 | 10/2005 | Kreitzer |
| 2005/0256956 | A1 | 11/2005 | Littlefield et al. |
| 2005/0278630 | A1 | 12/2005 | Bracey |
| 2005/0286736 | A1 | 12/2005 | Rhoads |
| 2006/0041428 | A1 | 2/2006 | Fritsch et al. |
| 2006/0056626 | A1 | 3/2006 | Keohane et al. |
| 2006/0111904 | A1 | 5/2006 | Wasserblat |
| 2006/0118614 | A1 | 6/2006 | Rose |
| 2006/0129948 | A1 | 6/2006 | Hamzy et al. |
| 2006/0210071 | A1 | 9/2006 | Chandran |
| 2007/0016419 | A1 | 1/2007 | Lee et al. |
| 2007/0071223 | A1 | 3/2007 | Lee et al. |
| 2007/0076312 | A1 | 4/2007 | Jordan |
| 2007/0116230 | A1 * | 5/2007 | Brandt ................ H04M 3/5231 379/211.02 |
| 2007/0124243 | A1 | 5/2007 | Hamada |
| 2007/0124601 | A1 | 6/2007 | Singh |
| 2007/0195945 | A1 * | 8/2007 | Korenblit ............... G06Q 10/06 379/265.06 |
| 2008/0049933 | A1 | 2/2008 | Kuroda |
| 2008/0221882 | A1 | 9/2008 | Bundock et al. |
| 2008/0229230 | A1 | 9/2008 | Grigoriev et al. |
| 2009/0307779 | A1 | 12/2009 | Doren |
| 2010/0111288 | A1 * | 5/2010 | Afzal ................ H04M 3/5232 379/265.14 |
| 2010/0142710 | A1 | 6/2010 | Chrysler et al. |
| 2012/0215845 | A1 | 8/2012 | Aad |
| 2013/0104041 | A1 | 4/2013 | Seshagiri et al. |
| 2013/0244632 | A1 | 9/2013 | Spence et al. |
| 2013/0246116 | A1 | 9/2013 | Bank |
| 2014/0270135 | A1 | 9/2014 | Odinak et al. |

OTHER PUBLICATIONS

Al Aubaidi, Rasha S.; Office Action; U.S. Appl. No. 13/802,710; dated Apr. 4, 2017; United States Patent and Trademark Office; Alexandria, VA.

Al Aubaidi, Rasha S.; Final Office Action; U.S. Appl. No. 13/802,710; dated Oct. 17, 2016; United States Patent and Trademark Office; Alexandria, VA.

Al Aubaidi, Rasha S.; Office Action; U.S. Appl. No. 13/802,710; dated Mar. 23, 2016; United States Patent and Trademark Office; Alexandria, VA.

Al Aubaidi, Rasha S.; Final Office Action; U.S. Appl. No. 13/802,710; dated Oct. 6, 2015; United States Patent and Trademark Office; Alexandria, VA.

Al Aubaidi, Rasha S.; Office Action; U.S. Appl. No. 13/802,710; dated Apr. 3, 2015; United States Patent and Trademark Office; Alexandria, VA.

Al Aubaidi, Rasha S.; Final Office Action; U.S. Appl. No. 13/802,710; dated Dec. 24, 2014; United States Patent and Trademark Office; Alexandria, VA.

Al Aubaidi, Rasha S.; Office Action; U.S. Appl. No. 13/802,710; dated Jun. 5, 2014; United States Patent and Trademark Office; Alexandria, VA.

Al Aubaidi, Rasha S.; Advisory Action; U.S. Appl. No. 13/802,710; dated Jan. 4, 2017; United States Patent and Trademark Office; Alexandria, VA.

Al Aubaidi, Rasha S.; Advisory Action; U.S. Appl. No. 13/802,710; dated Jan. 29, 2016; United States Patent and Trademark Office; Alexandria, VA.

Al Aubaidi, Rasha S.; Advisory Action; U.S. Appl. No. 13/802,710; dated Mar. 5, 2015; United States Patent and Trademark Office; Alexandria, VA.

Odinak, Gilad; U.S. Appl. No. 17/023,836, filed Sep. 17, 2020; United States Patent and Trademark Office; Alexandria, VA.

* cited by examiner

80

90

COMPUTER-IMPLEMENTED SYSTEM AND METHOD FOR EFFICIENTLY FACILITATING APPOINTMENTS WITHIN A CALL CENTER VIA AN AUTOMATIC CALL DISTRIBUTOR

CROSS-REFERENCE TO RELATED APPLICATION

This U.S. Patent Application is a continuation of U.S. Pat. No. 9,819,798, issued Nov. 14, 2017, the priority date of which is claimed and the disclosures of which are incorporated by reference.

FIELD

The present invention relates in general to call centers and, in particular, to a system and method for efficiently scheduling and facilitating appointments within a call center via an automatic call distributor.

BACKGROUND

Customer call centers, or simply, "call centers," are often the first point of contact for customers seeking direct assistance from manufacturers and service vendors. Call centers provide customer support and problem resolution are reachable by telephone, including data network-based telephone services, such as Voice-Over-Internet (VoIP), or by a Web application that allows customers to make calls. Although World Wide Web- and email-based customer support are becoming increasingly available, call centers still offer a convenient and universally-accessible forum for remote customer assistance. The timeliness and quality of service provided by call centers is critical to ensuring customer satisfaction. Minimizing delays is crucial, even when caller volume is high.

Within a call center, agents generally receive incoming calls from customers and address the customers' concerns. Supervisors manage the agents by tracking and reviewing agent performance, call efficiency, and customer satisfaction, among other performance metrics. The supervisors generally relay the performance feedback to the agents during a meeting, such as an in-person meeting, such as in a brick and mortar call center, or via a telephone call for remotely-located agents.

To conduct the meeting, the agent must first be removed from a call queue so that the agent no longer receives incoming customer calls. However, removal of an agent from the call queue can increase customer hold time, such as when the meeting is scheduled during a time when the call center becomes busy and the agent is needed to answer calls or when the agent is needed to answer a specific type of inquiry that other agents cannot satisfy. Therefore, removing an agent from a queue to attend a meeting with his supervisor can result in long hold times and create frustration of the callers, which leads to an unsatisfactory customer experience.

Accordingly, a system and method to efficiently schedule meetings with agents without disrupting a flow of the call center is needed. Preferably, the system and method schedule the meetings when an agent is most available.

SUMMARY

To improve call efficiency and customer satisfaction, meetings between agents and their supervisors should take place at a time when the agents can be removed from their call queue without increasing customer hold times. To ensure that an agent is available for meeting with his supervisor, a supervisor provides an automatic call distributor with a list of agents with whom the supervisor wishes to schedule appointments. The automatic call distributor can identify a most available agent for immediately transferring to the supervisor for conducting a meeting. Further, the automatic call distributor can schedule appointments with the supervisor for the remaining agents on the list or can continue to monitor each agent's availability in real time for automatically connecting that agent with their supervisor at a time when the agent can be easily removed from the call queue without affecting a length of customer hold time.

An embodiment provides a computer-implemented system and method for facilitating appointments within a call center. A list of agents for scheduling meetings within a call center is received from a user. An availability status is determined for each agent on the list at a common time. A determination that all the agents on the list are unavailable for a meeting with the user at the common time is made. A notice is provided to the user that all the agents on the list are unavailable. The agents are tracked, and at a later time, one of the agents is determined to be available. A determination is made that the user is available at the later time and the available agent is transferred to the user.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

In a call center, supervisors monitor and provide feedback to agents, such as during a scheduled meeting to ensure that the call center runs efficiently and provides satisfactory customer service. However, the meetings themselves can contribute to inefficiencies in the call center that require callers to wait longer to receive assistance and service provisioning, such as when an agent meeting is scheduled during a time when the call center is busy and the agent is needed to answer calls. Often, a supervisor is unaware of the call center status and thus, fails to cancel or reschedule the meeting. Meetings between an agent and a supervisor can be efficiently scheduled via an automatic call distributor (ACD) by identifying an available agent, providing the supervisor with an agent file, and connecting the agent with the supervisor. Identifying available agents and initiating a meeting for the agents can prevent meetings from being scheduled when the call center is busy and can also reduce the amount of time needed to conduct the meeting.

Figure 1:
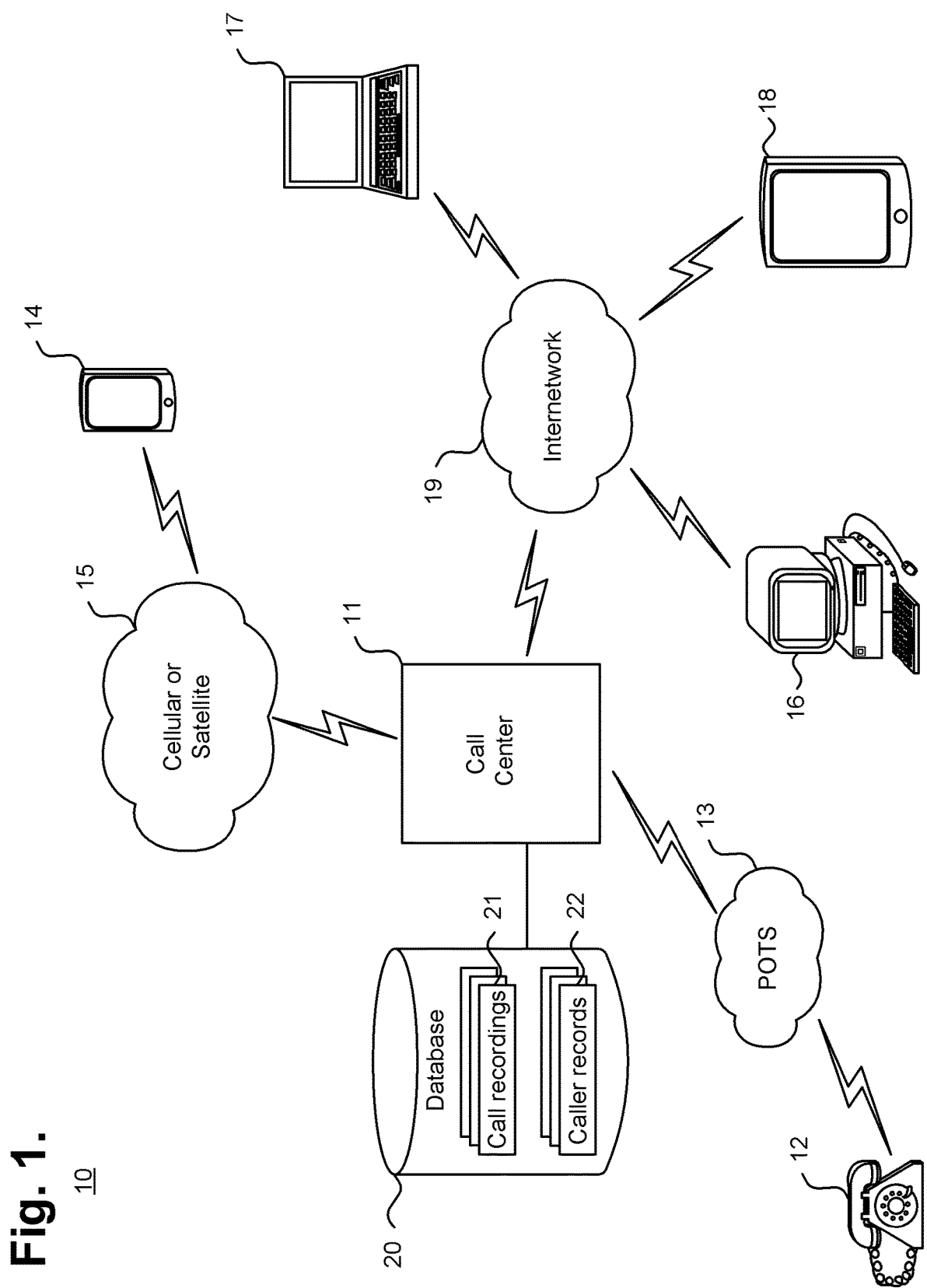
FIG. 1 is a functional block diagram showing an environment for receiving incoming calls in a call center.

A call center services incoming customer calls. FIG. 1 is a functional block diagram showing an environment 10 for receiving incoming calls in a call center. The call center 11 receives incoming calls from conventional telephone handsets 12 through Plain Old Telephone Service (POTS) 13 and from portable handsets 14 through cellular and satellite telephone service 15. Calls can also be received from desktop 16, portable 17 or tablet 18 computers, including VoIP clients, Internet clients and Internet telephony clients, through an internetwork 19, such as the Internet. In one embodiment, a call can be initiated through a Web application, such as on a smart phone, tablet, or other type of computing device. For instance, a banking application can include information regarding a user's account, including balance, debits, and deposits, as well as a call button, that automatically initiates a call between the user and a call center of the bank when pressed.

The call center 11 is associated with a database 20 in which call recordings 21 and caller records 22 can be stored for use during an incoming call or at a later time. For instance, a caller of an incoming call can be identified and the record associated with that caller can be obtained for providing to an agent assigned to handle the incoming call. Further, recordings of the call between the caller and the agent can be stored as a call recording 21.

The handsets 12, 14, computers 16-18, and the call center, each include components conventionally found in general purpose programmable computing devices, such as a central processing unit, memory, input/output ports, network interfaces, and non-volatile storage, although other components are possible. Moreover, other information sources in lieu of or in addition to the servers, and other information consumers, in lieu of or in addition to the handsets and computers, are possible.

Figure 2:
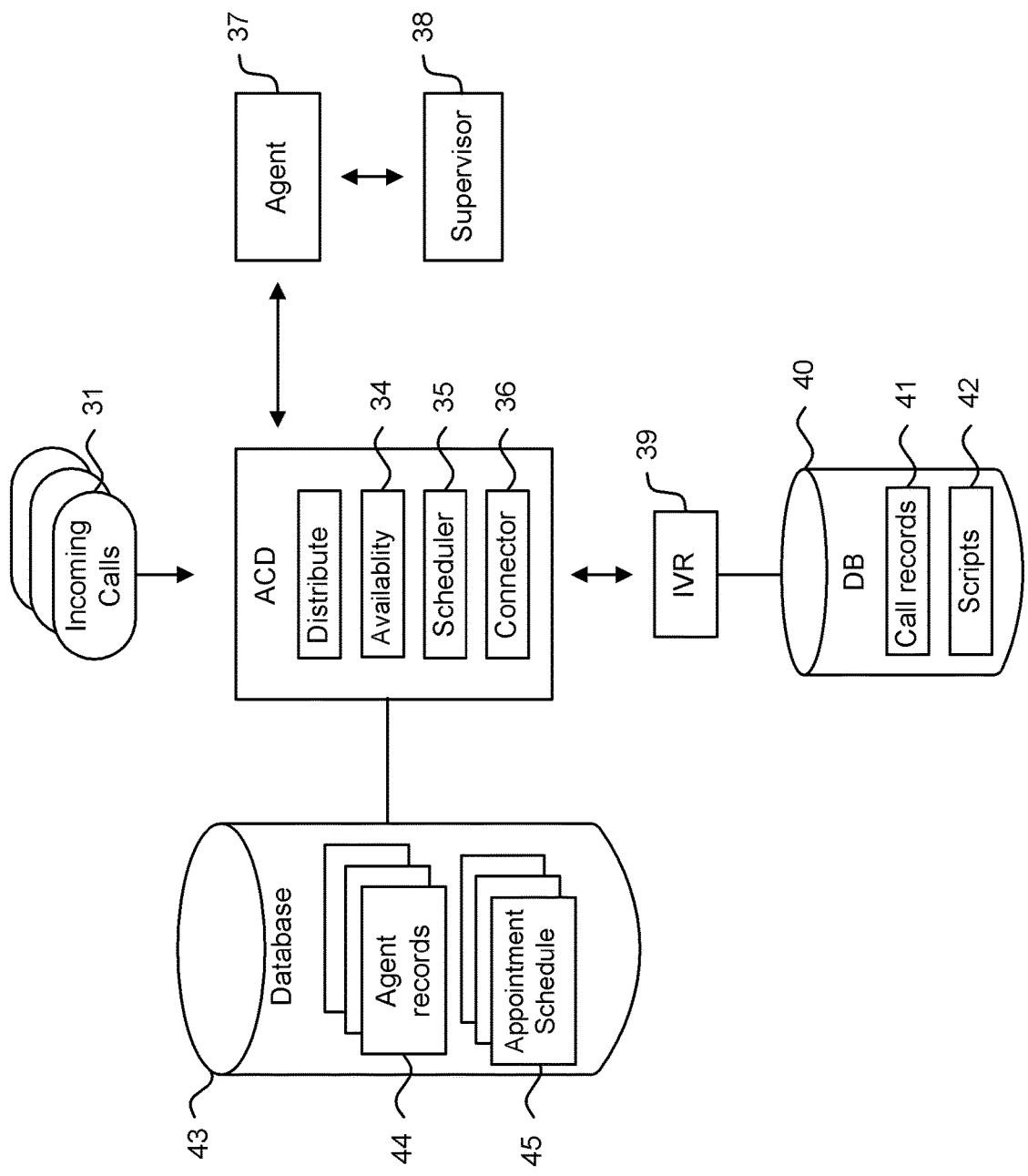
FIG. 2 functional block diagram showing a call center for efficiently facilitating appointments within a call center via an automatic call distributor, in accordance with one embodiment.

An ACD distributes the incoming calls of the call center to agents and determines an availability of the agents for efficiently scheduling meetings. FIG. 2 functional block diagram showing a call center 30 for efficiently facilitating appointments within a call center via an automatic call distributor, in accordance with one embodiment. A multitude of telephone calls 31 are received into the call center by an ACD 32 through a Private Branch Exchange (not shown) or other telephonic connection for distribution. The ACD 32 includes a distributor 33, an availability determiner 34, a scheduler 35, and a connector 36. The distributor 33 initially assigns each received incoming call to an Interactive Voice Response (IVR) 39 or to a call center agent terminal managed by an agent 37.

Once received, the IVR 39 can obtain data from the caller during the incoming call or provide responses to caller questions using prerecorded audio 41 or dynamically generated audio, such as based on a stored script 42. The prerecorded audio 41 and scripts 42 can be stored in a database 40 interconnected to the IVR 39. The IVR serves to obtain information from the caller or resolve a caller concern without utilizing an agent. However, if necessary, the call can be transferred from the IVR to an agent or supervisor via the ACD.

Agents 38 are live individuals that answer and handle calls within a call center to enable information collection and trouble-shooting on behalf of customers or callers. Each agent 37 can be associated with a particular call queue for handling specific predetermined subject matter. For example, call queues can be generated for different service departments or subgroups of the call center, such as customer service, new subscriptions, trouble shooting, billing and collection. If no agent is available within a particular queue to which the call should be transferred, the call is placed on a hold list for that queue. As agents in the queue become available, the calls on the hold list can be answered, such as in a first in, first out order, as well as other types of order, such as described in U.S. Patent Application Publication No. 2008/0246592, to Waalkes.

The ACD assigns a call to an agent based on agent criteria factors, which can include skill level, seniority, a number of open tickets, and queue length, such that the call will be transferred to the agent best suited to take the call. For example, a caller with a difficult question may be transferred to a senior agent who has the fewest number of open tickets. The agent criteria are further described below with reference to FIG. 3. The ACD can also identify a particular agent that shares common characteristics with a caller for transferring the call, as described in commonly-owned U.S. Pat. No. 8,837,687, to Odinak, issued on Sep. 16, 2014, the disclosure which is hereby incorporated by reference. For instance, the characteristics can include gender, age, nationality, ethnicity, and accent. Other characteristics are possible.

Calls can also be directed to a supervisor 38. A supervisor 38 monitors one or more agents to ensure that the agents are efficiently and sufficiently handling caller concerns, and handles escalated calls, which can be transferred from an agent to the supervisor. To ensure that the agents are effective, the supervisor provides feedback to the agents by submitting a list of agents (not shown) to the ACD.

Once the call is assigned, such as to an agent, the call is recorded in an agent record 44 as an open ticket. A database 43 interconnected to the ACD stores the agent records 44 and appointment schedules 45 for the supervisors and agents. An availability determiner 35 identifies a most available agent for automatically connecting to a supervisor to conduct a meeting. Specifically, the availability determiner 34 uses the list of open tickets, along with other agent criteria, such as skill level, seniority, and queue length to determine whether an agent is available to meet with the requesting supervisor. The most available agent can be immediately connected to the supervisor or connected at a scheduled time, such as after finishing a current call. Meanwhile, other agents requested by the supervisor can be scheduled to meet with the supervisor at later times. The scheduler 35 uses the availability information to schedule appointments between one of the agents and the requesting supervisor. The appointments are then stored in the appointment schedule 45 for automatically connecting the agent and supervisor at the scheduled time. Finally, the connector 36 removes the most available agent or scheduled agent from the call queue and connects the agent with the supervisor. The agent-supervisor connection can occur via telephone or Web conferencing, as well as by other means.

Additionally, the ACD include one or more modules for carrying out the embodiments disclosed below. The modules can be implemented as a computer program or procedure written as source code in a conventional programming language and is presented for execution by the central processing unit as object or byte code or written as interpreted source code in a conventional interpreted programming language interpreted by a language interpreter itself executed by the central processing unit as object, byte, or interpreted code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 3:
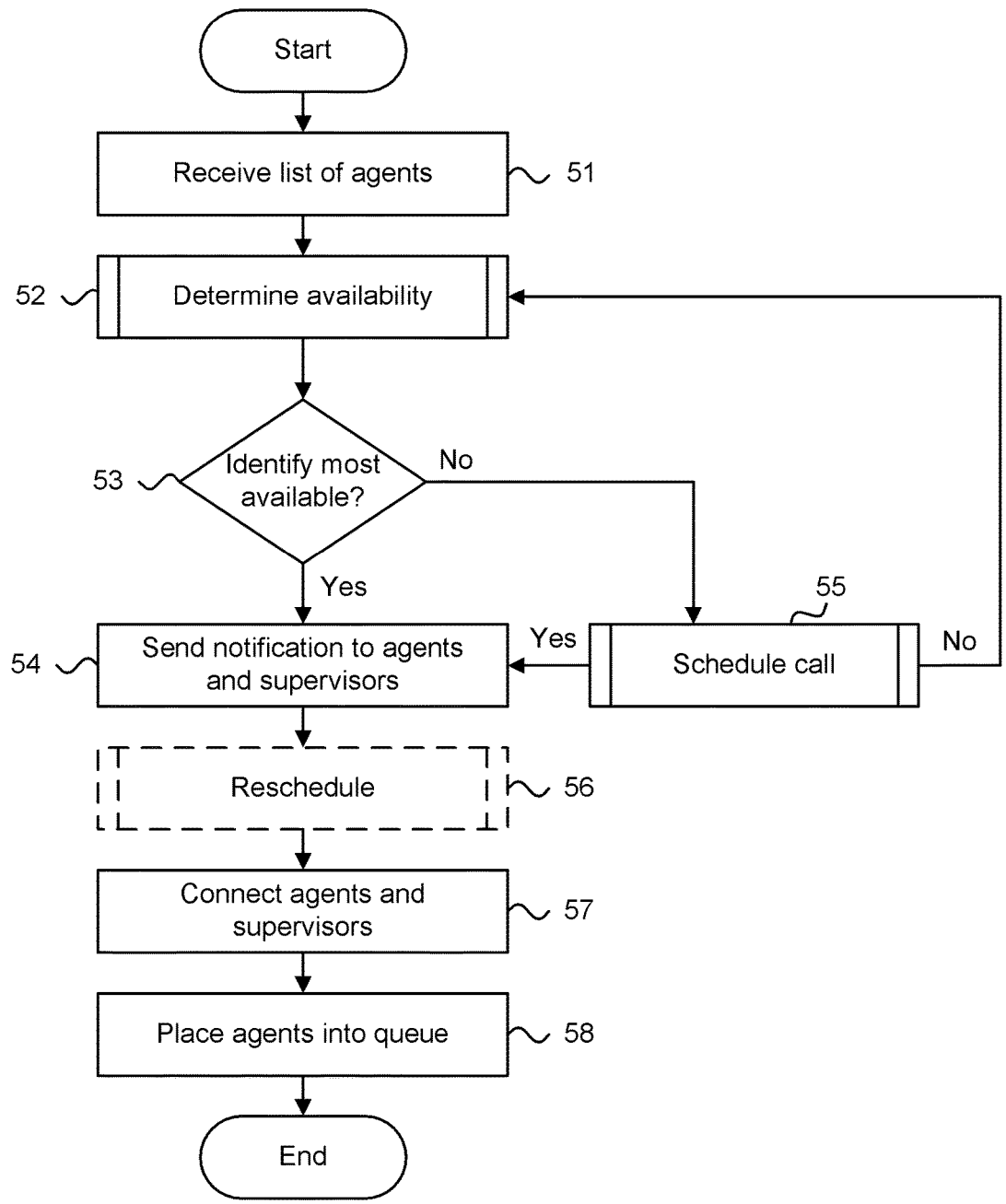
FIG. 3 is a flow diagram showing a method for efficiently facilitating appointments within a call center via an automatic call distributor, in accordance with one embodiment.

Scheduling of appointments by the ACD increases call center efficiency by keeping agents on the phones when they are most needed, as well as reduces the time needed to organize and conduct a meeting by facilitating the meeting connection. FIG. 3 is a flow diagram showing a method 50 for efficiently facilitating appointments within a call center via an automatic call distributor, in accordance with one embodiment. A supervisor accesses a Web page on which he inputs a list of one or more agents with whom he wishes to schedule a meeting during a particular time period, such as a day or week. Other time periods are possible.

The agent list can include rankings of the agents or weights to indicate an importance of meeting with that agent. For instance, an agent with a higher ranking or a higher weight can indicate that the supervisor wants to meet with that agent more than an agent with a lower ranking or weight. Along with the list of agents, the supervisor can also input his availability to meet with the agents. However, if availability is not included, a determination that the supervisor is available at the time of the request can be made as a default.

Figure 4:
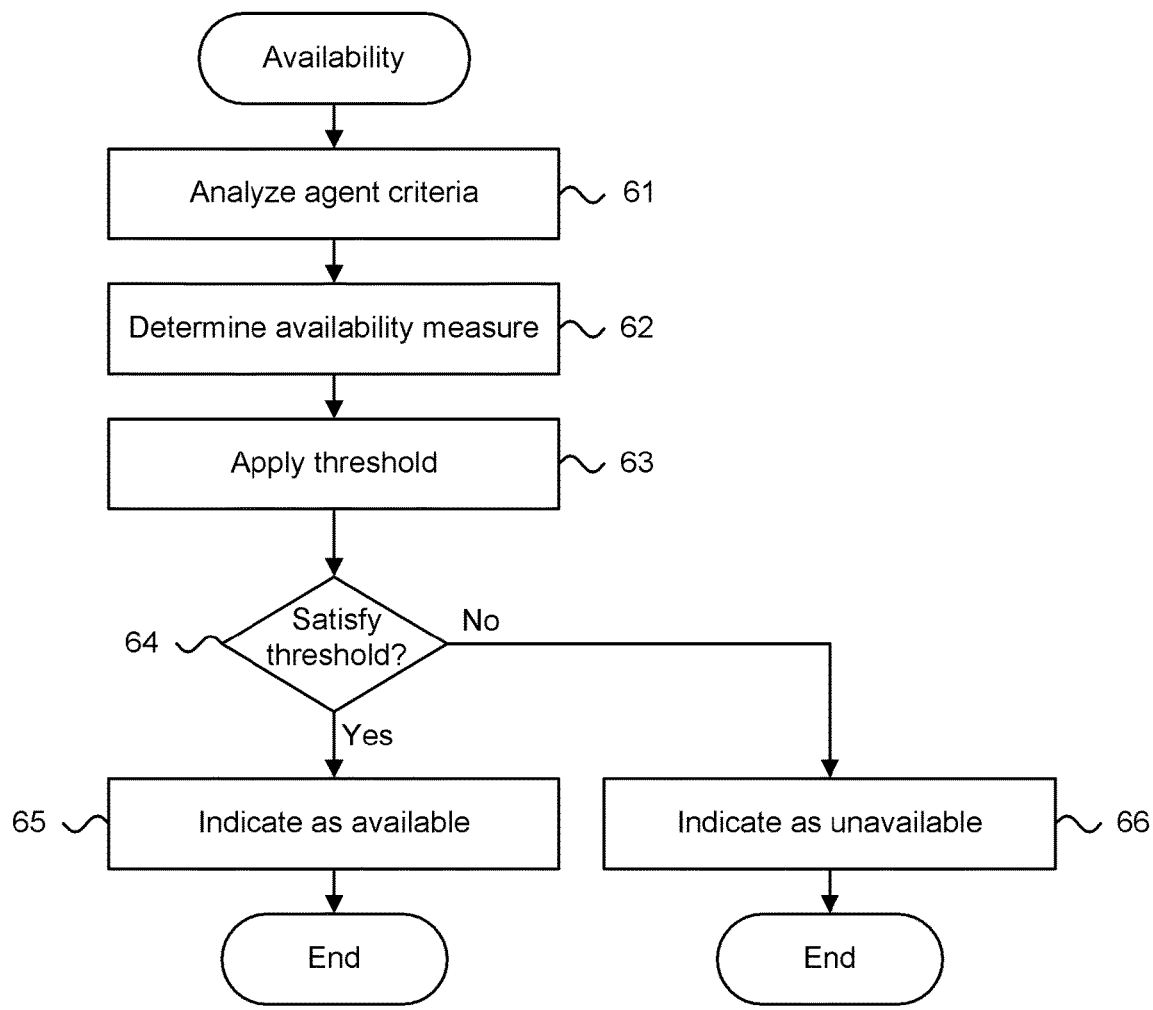
FIG. 4 is a flow diagram showing, by way of example, a process for determining agent availability.

The ACD receives the list of agents (block 51) and determines a status of availability (block 52) for each agent on the list based on a set of agent criteria, which are described below in further detail with respect to FIG. 4. The agent criteria can include, for example, agent skill level or busyness of the queue. The agent availability can be determined at the time of the request, as well as at other times, including times provided by the supervisor or a default time. For instance, the supervisor can indicate that he is available to meet with one or more agents at the time of entering the list of agents and the agent availability is determined at the time of the request for identifying the agent that is best able to leave the call queue and meet with the supervisor. Alternatively, the supervisor may provide a list of agents at 8 a.m. and indicate that he is not available to meet with any agents until 10 a.m., at which point availability of the agents can be determined.

Figure 6:
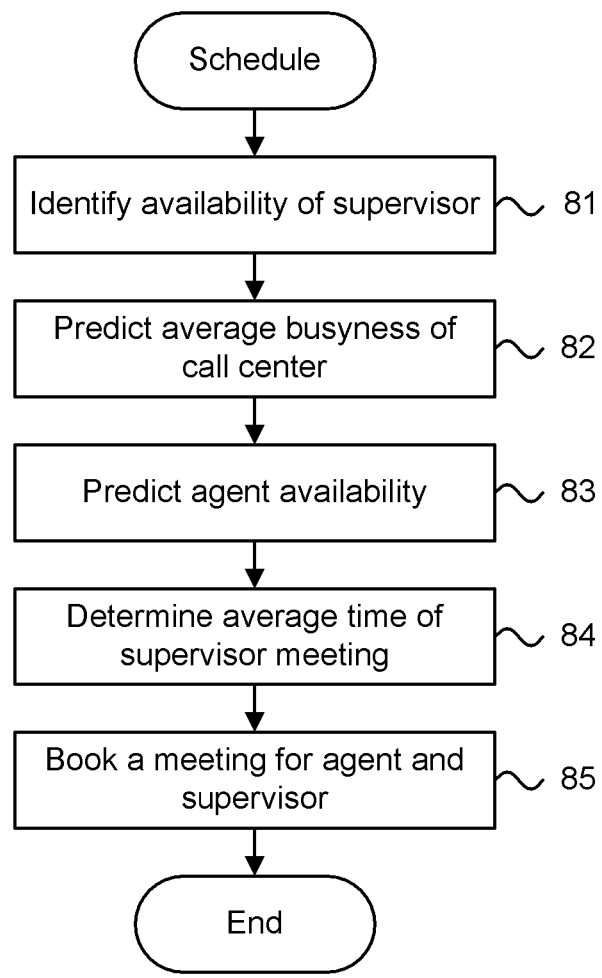
FIG. 6 is a flow diagram showing, by way of example, a process for scheduling meetings with agents.

However, in a further embodiment, the agent availability at 10 a.m. can be determined at 8 a.m. and a meeting can be scheduled, as described below with reference to FIG. 6. If, the status of the scheduled agent's availability changes by 10 a.m., the meeting can automatically be rescheduled, as described further below with reference to FIG. 7.

Once availability is determined, a further determination is made (block 53) as to whether the available agent is a most available agent. The most available agent is one that can be removed from the queue with the least disruption and can be identified based on a ranking of the agents. In one embodiment, the agents are ranked in descending order by availability and the agent at the top of the list is identified as the most available agent. However, other order or ranking schemes and agent selection are possible, such as ascending order and alphabetically. Further, other factors can be considered when determining the most available agent, such as an importance of the meeting between the agent and the supervisor, an urgency of the meeting, and a nature of the meeting. For instance, two or more agents may be equally available and the agent with whom the supervisor is most interested in speaking with can be selected as the most available. The ACD can remove the most available agent from a call queue and connect the most available agent with the requesting supervisor, as described below.

In one example, Supervisor Lee manages 60 agents and attempts to meet with each agent at least twice a month to provide feedback on call handling, resolving customer concerns, call efficiency, and call resolution. Thus, to ensure that Supervisor Lee succeeds in meeting with each agent twice a month, he must talk to at least 6 agents per work day based on a 20 day work month. In this example, Supervisor Lee enters daily lists of agents with whom he wants to meet with that day. Specifically, on Monday, Supervisor Lee accesses a Web page for entering a list of six agents and indicates that he is currently available for a meeting with one of the agents. In a further embodiment, the list of agents can also be entered on a weekly basis and Supervisor Lee can enter the names of 30 agents, on Monday, with whom he wants to meet with during the upcoming week. Other time periods for entry are possible, including twice a week, three times a week, every other week, and so on, as well as a combination of different time periods. However, the current example will follow the daily entry of agents.

Once Supervisor Lee enters the list of agents, an availability status of each agent is determined. The first, third, fourth, and six agents are determined to be unavailable, while the second and fifth agents are assigned an "available" status with an availability measure. The availability measure can be a quantitative value representing an availability of an agent that is determined based on agent criteria. In this example, Agent #2 is a senior agent with seven years experience and has 3 open tickets, and is assigned an availability measure of 8, while Agent #5 is a newer agent with 1.5 years experience and has 1 open ticket, and is assigned an availability measure of 5. Agent #2 received a higher availability measure since he is able to resolve customer concerns quickly due to his experience and is likely to resolve the two open tickets faster than Agent #5 resolves the single open ticket. However, in a further embodiment, Agent #5 may receive a higher availability measure since he only has a single open ticket and a meeting with the supervisor will greatly benefit this agent since he is newer and still needs guidance and advice as to resolving certain issues. In this example, though, Agent #2 is determined to have a higher availability measure than Agent #5. Based on the availability measures, Agent #2 is selected as the most available agent.

If a most available agent cannot be identified (block 54), such as when there are no available agents because the call center is extremely busy and all the agents are needed to resolve caller concerns and prevent further back up, one or more of the listed agents can be optionally scheduled (block 55) for a meeting with the supervisor at a later time. Appointments for the agents can be scheduled in the future at a predicted best time, such as when the call center is generally slower to avoid removing an agent from the queue when he is needed to answer calls. Alternatively, if not scheduled, the agents listed by the supervisor can be tracked in real time throughout the requested meeting time period to identify when each of the agents becomes available (block 52). When no agents are available, the ACD can send a notice to the supervisor to inform him that there are no available agents, but one will be transferred upon becoming available.

Once the appointment is determined to occur at a specific time, a notification is sent (block 55) to the most available agent and each scheduled agent regarding the upcoming appointment. The notification can include a name of the supervisor, a time of the scheduled appointment, and a subject of the appointment, as well as a link to the agent's records. Other information for inclusion in the agent and supervisor notifications is possible. The agent records can each include call metrics, such as number of calls handled, percentage of calls in which a resolution was reached, and average talk time per call, as well as other types of call metrics.

Figure 7:
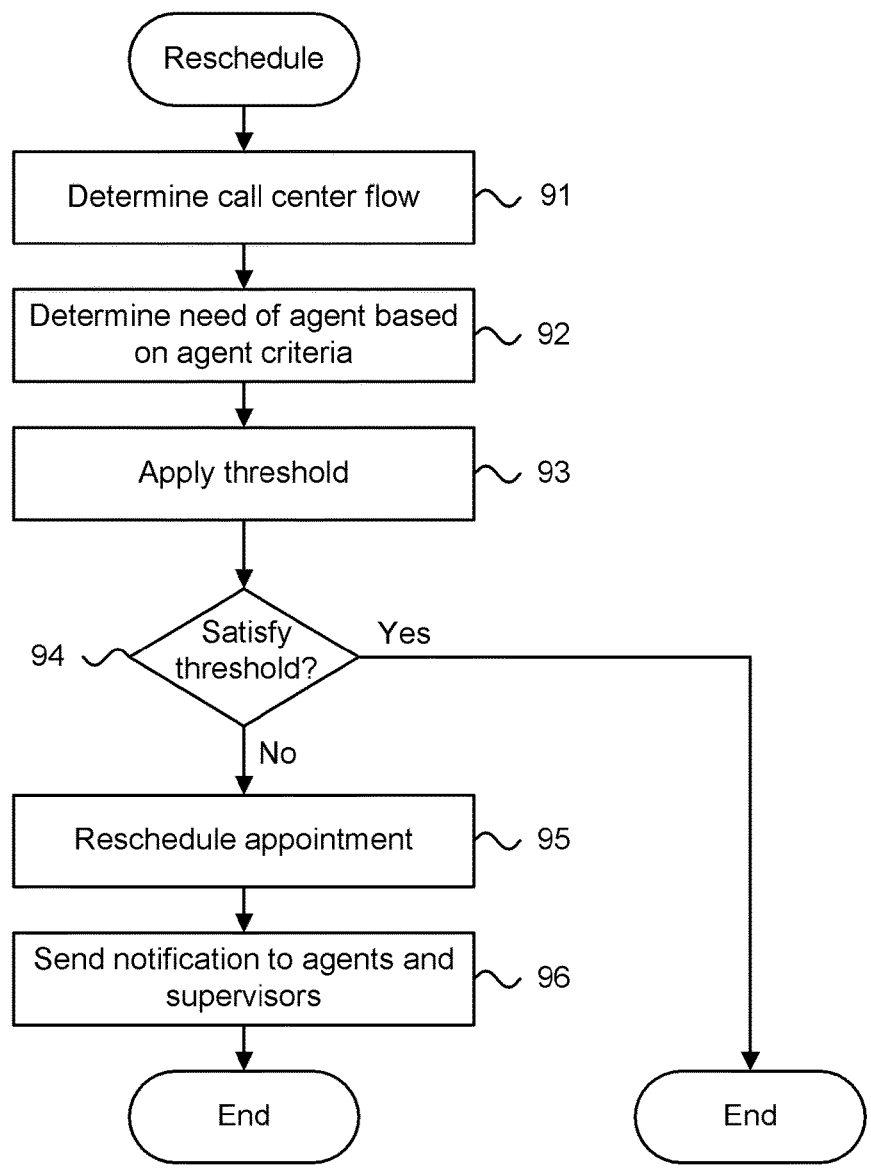
FIG. 7 is a flow diagram showing, by way of example, a process for rescheduling meetings with agents.

If prior to the time of the actual meeting, the agent is no longer available, the meeting can optionally be rescheduled (block 57), as described in detail below with reference to FIG. 7. However, if the agent is still available, the ACD automatically removes the agent from the call queue and connects (block 58) the agent with the supervisor to conduct the meeting. The connection can occur via telephone or Web conferencing, as well as other type of media connections. Prior to connecting the agent and supervisor, a voice or written greeting can be provided to that states "you are now talking to 'Agent X' or 'Supervisor Y.'" The ACD can also provide the supervisor with the agent's records at the time of transferring the agent.

Upon termination of the meeting, the ACD immediately places the agent back into the call queue (block 59) to assist in answering incoming customer calls. The other agents that remain on the supervisor's list can be tracked and connected to the supervisor upon a determination that each such agent is available. To ensure the supervisor is available when the agents are transferred, the supervisor can provide an indication of his availability by, for example, logging into his telephone or a Web page, which provides notice to the ACD that the supervisor is available to take calls, or by entering available time periods into a Web page with, for example, the list of agents. Other methods for relaying supervisor availability to the ACD are possible.

Returning to the example above, Agent #2 is identified as the most available agent. A notification is sent to Agent #2 to provide notice that the agent will be meeting with Supervisor Lee upon completion of the two open tickets to discuss Agent #2's call statistics for the previous week. The same or a different notification is sent to Supervisor Lee to identify the agent with whom the meeting is scheduled, as well as a time at which the agent becomes available and the meeting will occur. For instance, the supervisor can receive a notice that the agent will be available in a couple minutes at which time the call will be connected. Agent #2 is able to promptly finish both open tickets and the call center is no busier than when the agent was determined to be available. Accordingly, the meeting need not be rescheduled to a later time. Agent #2 is connected to Supervisor Lee via the telephone during which the meeting is conducted. After the meeting has terminated, Agent #2 is placed back into the call queue and can immediately receive incoming customer calls. Throughout the remainder of the day, Monday, Supervisor continues to receive notifications for four other agents on the list with whom he conducts interviews. Subsequently, on Tuesday, Supervisor Lee enters a list of eight agents with whom he would like to meet with on this day because yesterday, he only met with five of the six agents and wants to ensure that he conducts at least six meetings on Tuesday.

Figure 5:
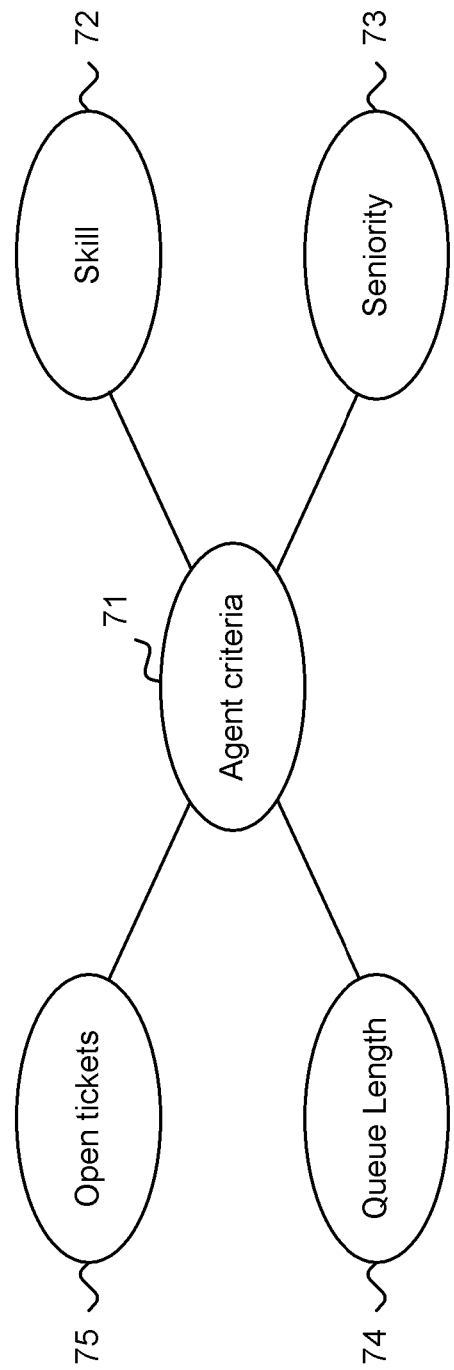
FIG. 5 is a block diagram showing, by way of example, agent criteria for determining availability according to FIG. 4.

Agent availability can be used to determine scheduling of the agent meetings with a supervisor. FIG. 4 is a flow diagram showing, by way of example, a process 60 for determining agent availability. For each agent, a set of agent criteria is analyzed (block 61) and one or more of the criteria are selected for determining agent availability. FIG. 5 is a block diagram 70 showing, by way of example, agent criteria 71 for determining availability. The agent criteria can include skill level 72 of the agent, seniority 73 of the agent, a length of the queue 74 in which the agent works, and a quantity of open tickets 75 assigned to the agent. The skill level 72 can be determined based on the types of calls handled by the agent, an average time per call, a success rate for resolved calls, or an average quantity of calls handled over a particular time period. Seniority 73 can be determined based on an amount of time an agent worked at the call center or an amount of time servicing a particular queue. Queue length 74 can be determined based on how many callers are in the queue, in addition to the nature of the calls and an average time to resolve calls of that nature. The quantity of open tickets 75 can be determined based on how many calls have been assigned to a particular agent. Other metrics for determining the agent criteria are possible. In one embodiment, the ACD can select the skill 72, seniority 73, queue length 74 and number of open tickets 75 to be used in determining agent availability. Alternatively, another call center component or employee of the call center can determine the agent criteria.

An availability measure is determined (block 62) for each selected agent criteria for each agent. The availability measure can be a numerical value that quantifies how the agent criteria apply to the agent. For instance, a high availability measure for agent skill level can indicate that an agent is highly skilled and can answer calls efficiently. Removal of that agent from the queue is more likely to effect customer wait time than a slower agent with a lower availability measure for skill and likely to render the highly skilled agent as less available than the lower skilled agent.

To determine the availability measure, each agent criteria can be associated with a level of values, one of which is assigned based on characteristics possessed by the agent and call queue. The skill criteria assigns values based on how high the agent's skill level is at answering calls and addressing caller concerns, which can be determined from the factors described above with reference to FIG. 5, including a type or complexity of calls handled, a number of calls handled by the agent, a rate of successfully completed calls versus unresolved calls, and an average time per call, as well as other skill factors. The seniority criteria assigns values based on how long an agent is employed at a company associated with the call center. The call queue criteria assigns a value based on a busyness of the queue to which the agent belongs. The queue busyness can be determined based on a number of callers assigned to the queue, a number of agents assigned to the queue, a difficulty of subject matter addressed by the agents in that queue, and an average time to complete a call within that queue, which can be used singly or in combination to indicate busyness. The open ticket criteria assigns a value based on how many calls are assigned to the agent. Once values for one or more of the criteria are assigned, the values for the selected agent criteria are summed to determine the availability measure for each agent. In a further embodiment, one or more of the criteria can be weighted to ensure that the most important criteria are more highly considered, rather than giving each agent criteria equal weight.

Returning to the above example, Agent #2 and #5 are determined to be available. Their availability is determined based on the skill, seniority, call queue, and open ticket criteria. For skill, a value of one can be assigned to those agents with few or low skills, a two for those agents with medium or standard skill sets, and a three for high or above-standard skill sets. For seniority, a value of one is assigned to the agent for one year or less employed at the call center, a value of two for one to five years employed at the call center, a value of three for six to 10 years at the call center, and a value of four for more than 10 years at the call center. The queue length value is assigned based on a busyness of the queue and a value of one is assigned to a slow or below standard queue, a two for a moderately busy or standard queue, and a three for a very busy or above standard queue. The same determined value can be assigned to each agent in that queue. Finally, for open tickets, a value of one is assigned to agents with a minimal or below standard number of calls, a two is assigned to agents with an average or standard number of calls, and a three is assigned to agents with a high or above standard number of calls. Other value levels are possible for the agent criteria.

Alternatively, categories, such as below standard, standard and above standard, can be used to determine availability. For instance, if the skill level of an agent is standard, the seniority is below standard, the call queue is below standard, and the open tickets are below standard, the agent can be determined to be available since three of the four skill levels have been assigned a category of below standard and removal of a lesser skilled agent from a call queue that is not busy is unlikely to impact customer wait time. Other values and intervals of values are possible.

Once determined, a threshold is applied (block 63) to the availability measures of each agent. If the threshold is satisfied (block 64), the agents associated with the availability measures are determined to be available (block 65). Otherwise, if the threshold is not satisfied (block 64), the agents associated with the availability measures are determined to be unavailable (block 66). As described above, a most available agent can be selected from the available agents to schedule a first appointment with the supervisor, which can occur upon determination of the agent as a most available agent. The most available agent is one that can best be pulled from the call queue without creating a disturbance, such increased caller wait time.

The remaining agents, other than the most available agent, can then be tracked in real time to monitor availability for meeting with the supervisor, as described above with reference to FIG. 3 or can be scheduled to meet with the supervisor. If scheduled, the appointment between an agent and a supervisor can be made based on predicted levels of busyness of the call center. FIG. 6 is a flow diagram showing, by way of example, a process 80 for scheduling meetings with agents. An availability of the supervisor is determined (block 81). The supervisor availability can be determined based on times provided by the supervisor or a schedule maintained by the ACD for the supervisor.

Subsequently, a busyness of the call center is predicted (block 82) during the times when the supervisor is available based on predetermined averages of busyness, for instance. Next, agent availability is predicted (block 83) during the times of supervisor availability based on the predicted busyness of the call center; however, other factors can be considered, such as agent experience, type of calls handled by an agent, and call handling statistics for each agent. Also, an average meeting time for the particular supervisor is determined (block 84). The average meeting time can be used to determine how close together meetings can be scheduled. For example, a supervisor with a one hour time period of availability can schedule up to six agent appointments if the average appointment time is 10 minutes, whereas a supervisor with an average time period of 15 minutes can only schedule up to four agent appointments. Finally, an appointment is booked (block 85) for one or more of the remaining agents.

As the time approaches for a scheduled appointment, the actual activity within the call center may differ from the predicted busyness at the time the appointment was scheduled. The call center may be busier than expected, in one example, and the removal of even a single agent from the call queue is likely to create additional customer wait times. To prevent an increase in wait time, the appointment can be rescheduled. FIG. 7 is a flow diagram showing, by way of example, a process 90 for rescheduling agent-supervisor meetings. A flow or busyness of the call center is determined (block 91) at a time just prior to a scheduled appointment. The time period can be two, five, or seven minutes, as well as other time periods and can be determined by the ACD, other call component, or an individual associated with the call center, such as a manager or supervisor. A need of the agent to participate in answering queued calls is determined (block 92) based on the flow of the call center and the agent criteria. The need can be quantified by assigning a value to each of the agent criteria considered and the busyness of the call queue.

A threshold is applied (block 93) to the agent need measures and if the threshold is satisfied (block 94), the agent can be removed from the queue to attend the scheduled appointment without any adverse effects to the call queue. However, if the agent need measures do not satisfy the threshold (block 94), the appointment can be rescheduled (block 95), as described above with reference to FIG. 6. Finally, notice of the rescheduled appointment can be provided (block 96) to each of the agent and supervisor. The notice can include a new date and time of the scheduled appointment, the names and contact information of the individuals participating in the appointment, and a subject for discussion during the appointment, as well as other information.

In a further embodiment, the call center can become busy while the agent and supervisor are participating in a meeting. The ACD continuously monitors the call queues within the call center to determine a flow of the queues. If the ACD determines that one or more of the queues is too busy and further agents are needed, any meetings being conducted, that were facilitated by the system, can be terminated and the agents returned to the appropriate queue for answering the backlog of calls. Once the backlog is reduced, the agent can then be automatically returned to the meeting or the meeting can be scheduled for a later time.

Further, a supervisor may be needed to assist on a call during a meeting being conducted with an agent. In such case, as well as in other scenarios, the ACD can send the supervisor a notice to terminate the meeting. Once terminated, the supervisor is transferred to the call needing assistance and once the assistance has been provided, a meeting with the agent can again be initiated by the ACD. The ACD can initiate the meeting by determining an availability of the agent, sending a notification to the agent and the supervisor when the agent is determined to be available, connecting the supervisor with the agent, and providing agent records or notes regarding the unfinished meeting to the supervisor.

Although the above description focuses on agent-supervisor meetings, other meetings are possible within and outside of a call center and the described processes can be applied to the other types of meetings. For example, in one embodiment, the meeting can be a training session. A list of all agents that should attend a particular training session can be provided to the ACD via a Web page. A supervisor or other employee of the call center can enter the agent list. An availability of each agent is determined. The available agents receive a notice from the ACD that they will be attending a training session and a time of the training session. Subsequently, the available agents are then connected via a conferencing system for the training session.

In a further embodiment, the ACD meeting facilitation system can be used to identify how many supervisors are needed in a call center. For instance, if a supervisor is not busy enough, he may be able to schedule all agent meetings within a few days, leaving him without work the remaining days. Also, the system can be used to track the busyness of an agent. If an agent is consistently busy and unavailable to meet with a supervisor, the meeting may become high priority and eventually, the agent may have to be removed from the queue regardless of whether removal may increase hold time. However, the agent can be removed at a time when he is least needed.

In yet a further embodiment, each supervisor can visually track the agents he manages, including those agents with whom he has spoken and those agents with whom he still needs to conduct a meeting. In one example, each agent management by a supervisor can be represented as a tile. The tile can have a shape of a square, rectangle, circle, or triangle, and the tiles can be the same or different. The tiles for all the agents can be combined to form a shape, such as a square or rectangle, which is presented to the supervisor. One or more of the tiles can be selected by the agent for scheduling a meeting and the selected tiles can be color coded, highlighted, removed from the combined shape of tiles and moved to a different part of the supervisor's display, or assigned a different shape tile. Further, once the supervisor speaks with one of the agents of the selected tiles, that tile can also be color coded, highlighted, removed from the combined shape of tiles and moved to a different part of the supervisor's display, or assigned a different shape tile to distinguish the agents with whom the supervisor has spoken from those agents with whom the supervisor has not spoken.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for facilitating appointments within a call center, comprising:
    an automatic call distributor (ACD) to receive incoming customer calls to a call center and to transfer each incoming customer call to an agent in to a call queue within the call center;
    a list of a portion of agents for scheduling meetings within a call center and received from a user;
    a server comprising a central processing unit, memory, an input port to receive the list of agents, and an output port, wherein the central processing unit is configured to:
        receive one or more of rankings or weights for each of the agents on the list;
        at an initial time, determine that all the agents on the list are unavailable for a meeting with the user;
        provide a notice to the user that all the agents on the list are unavailable;
        track the agents on the list for availability;
        identify at a later time, after the initial time, two or more of the agents on the list as available agents that are available for meeting with the user based on the tracked availability for the agents on the list;
        determine that the user is available at the later time when the available agents are determined to be available; and
        automatically connect one of the available agents with the user at the later time, based at least in part on the rankings or weights.

2. A computer-implemented system according to claim 1, wherein the central processing unit schedules an appointment with a particular one of the agents on the list at a time later than the initial time.

3. A computer-implemented system according to claim 2, wherein the central processing unit estimates a busyness of the call center at different times and determines that the estimated busyness of the call center is lowest at the time of the scheduled appointment.

4. A computer-implemented system according to claim 2, wherein the central processing unit estimates a busyness of the particular one agent at different times and determines that the estimated busyness of the particular one agent is lowest at the time of the scheduled appointment.

5. A computer-implemented system according to claim 2, wherein the central processing unit identifies that the particular one agent is unavailable at the time of the scheduled appointment and performs at least one of rescheduling the appointment and automatically connecting the particular one agent with the user when the particular one agent becomes available.

6. A computer-implemented system according to claim 1, wherein the central processing unit provides notice to the user that the one of available agent will be automatically connected.

7. A computer-implemented system according to claim 1, wherein the central processing unit provides to the user a visual display for the availability of the agents on the list.

8. A computer-implemented system according to claim 1, wherein the central processing unit identifies a time frame within which appointments with all the agents on the list are to be scheduled and automatically connects each agent with the user within the identified time frame.

9. A computer-implemented system according to claim 1, wherein the central processing unit determines the availability of the user based on one of times provided by the user and a schedule of the user.

10. A computer-implemented method for facilitating appointments within a call center, comprising:
    receiving incoming customer calls in a call center;
    transferring each incoming customer call to an agent signed into a call queue within the call center;
    receiving from a user a list of at least a portion of the agents for scheduling meetings;
    receiving one or more of rankings or weights for each of the agents on the list;
    at an initial time, determining that all the agents on the list are unavailable for a meeting with the user;
    providing a notice to the user that all the agents on the list are unavailable;

tracking the agents on the list for availability;
identifying at a later time, after the initial time, two or more of the agents on the list as available agents that are available for meeting with the user based on the tracked availability for the agents on the list;
determining that the user is available at the later time when the available agents are determined to be available; and
automatically connecting one of the available agents with the user at the later time, based on the received rankings or weights.

11. A computer-implemented method according to claim 10, further comprising:
scheduling an appointment with a particular one of the agents on the list at a time after the initial time.

12. A computer-implemented method according to claim 11, further comprising:
estimating a busyness of the call center at different times; and
determining that the estimated busyness of the call center is lowest at the time of the scheduled appointment.

13. A computer-implemented method according to claim 11, further comprising:
estimating a busyness of the particular one agent at different times; and
determining that the estimated busyness of the particular one agent is lowest at the time of the scheduled appointment.

14. A computer-implemented method according to claim 11, further comprising:
identifying that the particular one agent is unavailable at the time of the scheduled appointment; and
performing at least one of rescheduling the appointment and automatically connecting the particular one agent with the user when the particular one agent becomes available.

15. A computer-implemented method according to claim 10, further comprising:
providing notice to the user that the one of the available agents will be automatically connected.

16. A computer-implemented method according to claim 10, further comprising at least one of:
providing to the user a visual display for the availability of the agents on the list.

17. A computer-implemented method according to claim 10, further comprising:
identifying a time frame within which appointments with all the agents on the list are to be scheduled; and
automatically connecting each agent with the user within the identified time frame.

18. A computer-implemented method according to claim 10, further comprising:
determining the availability of the user based on one of times provided by the user and a schedule of the user.

* * * * *